Figure 1:
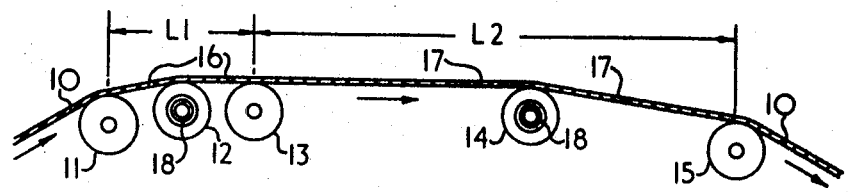

United States Patent

[11] 3,623,559

[72] Inventor Hugh L. Folkes
St. Leonard's-on-Sea, England
[21] Appl. No. 10,181
[22] Filed Feb. 10, 1970
[45] Patented Nov. 30, 1971
[73] Assignee The Dunlop Company
London, England
[32] Priority Mar. 8, 1969
[33] Great Britain
[31] 12,334/69

[54] METHOD AND APPARATUS FOR WEIGHT MEASUREMENT
10 Claims, 2 Drawing Figs.

[52] U.S. Cl.................................................... 177/1, 177/16, 198/39
[51] Int. Cl........................................... G01g 11/14
[50] Field of Search........................................ 177/1, 16, 119–121, 145; 222/55, 59; 198/39

[56] References Cited
UNITED STATES PATENTS
1,500,233 7/1924 Castricum.................... 177/1

| 1,646,950 | 10/1927 | Castricum.................... | 177/145 X |
| 2,552,189 | 5/1951 | Kuehni......................... | 177/145 X |
| 2,691,517 | 10/1954 | Schwartz et al............... | 177/145 X |

Primary Examiner—Richard B. Wilkinson
Assistant Examiner—George H. Miller, Jr.
Attorney—Stevens, Davis, Miller & Mosher ABSTRACT: The invention is concerned with the weighing of a belt or similar elongated flexible articles, by supporting the belt at spaced-apart position to provide two portions of different lengths. A load-sensing device is associated with each portion. The force exerted on each load-sensing device includes a force produced by tension in the belt. By arranging for the tension-produced force component to act in the same direction for each load-sensing device, the responses from the load-sensing devices can be combined to cancel out loading of the belt due to tension, to give the actual weight of the belt per unit length. The invention can be used for weight measurement of unloaded belts and similar articles, for control in manufacture for example, and for weight measurement of conveyors carrying freight.

METHOD AND APPARATUS FOR WEIGHT MEASUREMENT

This invention relates to the measurement of the weight-per-unit length of flexible elongated articles, and apparatus therefor. One use of the invention is for the improvement or control of the manufacture of longitudinally flexible elongated material. Typical examples of such material are conveyor belting, plastics sheeting, rubber sheeting and other materials extruded or otherwise produced in a continuous sheet form. Another use of the invention is the measurement of loads being carried by conveyors.

When producing long lengths of material, as by extrusion, it is desirable to be able to control the thickness of the material, or some other criteria such as weight-per-unit of length, to obtain maximum output efficiency. Particularly it is often essential to control thickness, or some other criteria, to ensure that the product meets certain requirements such as dimension standards. Usually only slight variations from a predetermined datum are permissible. Various methods are used for measuring the weight, and/or thickness of material, many being complex with moving measuring heads. Also, a steady constant tension in the material is usually necessary to produce accurate results. The present invention does not require that the tension in the material be maintained constant. The invention can be used too in the production of elongated material, to measure the weight-per-unit length, and thus the average thickness or other parameter, and also to weigh material being carried on or by an elongated member, such as a belt or other form of conveyor.

According to one aspect of the invention, a method of measuring the weight-per-unit length of a loaded or unloaded longitudinally flexible elongated article comprises mounting the article so that two different length portions of the article are associated each with a respective load-sensing device the article exerting on each load-sensing device a force which includes a tension-produced force whereby the component of the tension-produced force acting in a designed direction for each load-sensing device is substantially the same, the method further comprising the step of measuring by means of the load-sensing devices the component acting in the designed direction of the total force exerted on each load-sensing device by its respective position of the article.

According to another aspect of the invention, apparatus for measuring the weight-per-unit length of a loaded or unloaded longitudinally flexible elongated article comprises: tow load-sensing devices; means for mounting the article so that two different predetermined length portions of the article are associated one portion with one load-sensing device and the other portion with the other load-sensing device force whereby the articles exerts on each load-sensing device a force which includes a tension-produced force, the arrangement such that the component of the tension-produced force acting in a designed direction is substantially the same for both load-sensing devices, each load-sensing device being arranged to measure the component acting in the designed direction of the total force exerted on it by the respective portion of the elongated article.

The expression "designed direction" as used in this specification, means a direction chosen for the purpose of calculation as the direction in which to resolve the forces measured in the method according to the invention. The load-sensing devices employed in the method of the invention are of the kind having directional characteristics such that the response of each load-sensing device to a given force acting in a given direction is proportional to the magnitude of that force when resolved in a certain direction that certain direction that certain direction being referred to herein as the measurement axis of the load-sensing device. The measurement axis of the two load-sensing devices need not be parallel with each other since any angular inclination of one axis to the other can be allowed for in the calculation of the results.

Figure 2:
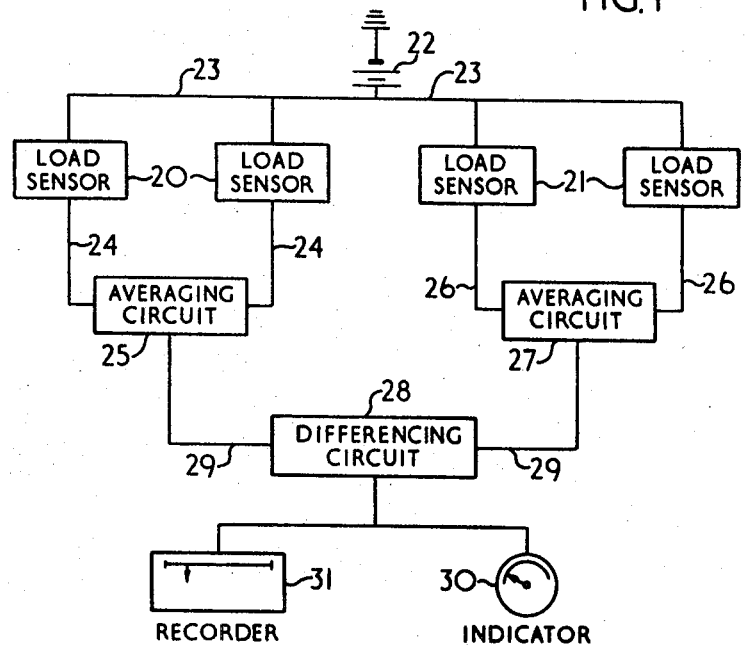

The invention will be understood by the following description of one embodiment of the invention, by was of example, in conjunction with the accompanying drawings, in which:

FIG. 1 is a diagrammatic illustration of the mounting of a length of conveyor belt, in accordance with the present invention, and FIG. 2 is a diagrammatic circuit diagram for the arrangement of FIG. 1.

In FIG. 1, a length of conveyor belt 10 passes over a series of rollers 11, 12, 13, 14 and 15. The rollers are mounted on a framework, (not shown) to form an apparatus. Rollers 11, 13 and 15 constitute first second and third support rollers respectively, rotatably mounted in the framework, and define two predetermined lengths or portions of belt 16 and 17. Rollers 12 and 14 constitute weighing rollers and are shown as supported by bearings 18 carried by load cells (not shown).

In the present example, the designed direction is for convenience, chosen as the vertical direction. The load cells are arranged to respond to the vertically directed component of any force applied thereto and thus the designed direction previously referred to is parallel to the axis of response of each load-sensing device.

The distance L1 between the first and second support rollers 11 and 13 is less than the distance L2 between the second and third support rollers 13 and 15, and the five weighing and support rollers are mutually arranged so that a length of mechanical belting under tension passing over and engaging the first and third support rollers 11 and 15 also engages the other three rollers 12, 13 and 14, thus weighing rollers 12 and 14 thus being respectively associated with different length portions 16 and 17 of the belting 10. The alignment of the belting on the approach and departure sides of the two weighing rollers 12 and 14 in relation to the designed direction of the force acting on each of the two weighing rollers arising from the tension of the belting is the same for both weighing rollers. This achieved by arranging the five rollers as regards their height and diameter so that the angle between the belt and the designed direction (in this case the vertical direction) on the approach and departure sides of the first weighing roller 12 are the same as on the departure and approach sides respectively of the second weighing roller 14.

Since the distance L1 between the first and second support rollers 11 and 13 in the longitudinal direction of the belt is less that the corresponding distance L2 between the second and third support rollers 13 and 15, the two weighing rollers are associated respectively with the two different length portions 16 and 17 of the belt, and exert on their respective weighing rollers vertically directed forces arising from the weights of the said different length portions of the belt. The response of the load cells associated with each weighing roller therefore includes a weight component proportional to these vertically directed forces and hence to the weights of the different length portions of belting. As each weighing roller is also subjected to a force arising from the tension of the belting and having a vertically directed component, the response of the load cells also includes a component arising from the tension. As explained above however, the resolved parts acting in the designed direction of these tension forces are arranged to be the same for each weighing roller and their effect on the response of the load cells is therefore eliminated by subtracting the response of the load cells of the first weighing roller from that of the second weighing roller. The difference is proportional to the difference in weight of the two lengths of belting between the weighing rollers and the machine can therefore be calibrated to read directly in units of weight-per-unit length of belting.

Each load cell is arranged to produce an electrical response proportional to the magnitude of the resolved part acting parallel to the measurement axis of the cell of any force acting on the cell. The electrical response of the load cells of the first weighing roller 12 are averaged, and the electrical responses of the other load cells treated likewise, and the difference of the two averaged responses used in the manner described above to indicate the weight-per-unit length of the belting.

FIG. 2 illustrates diagrammatically a circuit for obtaining an indication, as described above. the load cells are indicated at 20 and 21, cells 20 being positioned one at each end of weighing roller 12 and cells 21 positioned one at each end of weighing roller 14. A source of electric current, indicated by battery 22, is connected to the load cells by a lead 23. The load cells 20 are connected via leads 24 to an averaging circuit 25. Similarly load cells 21 are connected via leads 26 to an averaging circuit 27.

The averaging circuits are in turn connected to a differencing circuit 28 by leads 29 and the signals from the differencing circuit 28 is fed to some desirable item such as an indicator 30 or a recorder 31. Alternatively, or in addition, the signal from the differencing circuit can be fed to a control mechanism actuated by variations in output from the differencing circuit 28 to rectify and departures from a predetermined value. Thus the signal from the differencing circuit can be fed to a control to correct any variation in thickness, which variation would be sensed as an increase or decrease in weight of the belt.

The averaging circuits 25 and 27 provide signals which are the averages of the signals for the load cells at each end of the weighing rollers. The differencing circuit 28 gives a signal indicative of the difference between the signals from the average circuits 25 and 27.

In cases where the measurement axes of the load cells are not parallel with the designed direction or where the measurement axes of the load cells of one weighing roller are not parallel with those of of the other roller it is necessary to apply a correction factor to the averaged response of the load cells of the respective weighing rollers separately in accordance with the laws of trigonometry so that the parts of the responses of the load cells of each weighing roller used for the purpose of calculation are proportional to the resolved parts acting in the designed direction of the forces acting on the roller. It is only after such correction that the responses can be validly subtracted from each other to eliminate the effect of tension in the article being weighed.

It will be appreciated that in order to calculate (whether automatically or otherwise) the weight-per-unit length of a flexible article passing over apparatus according to the invention, the actual lengths or at least the relative lengths of the two different length portions of the article associated with the respective load-sensing devices, must be known. It will also be appreciated that the actual lengths of the said different length portions will vary slightly as the tension in the article varies since variations in the tension will alter the amount of sagging of the article between the various rollers. In the case of conveyor belting it can usually be validly assumed that the belting is sufficiently stiff and under under sufficient average tension for the variations in length referred to above to be ignored, the lengths of the said different length portions being assumed to be the straight line distances between the points of contact at any time of the belt with the first and second support rollers and with the second and third support rollers. For more accurate work, or where an article having significantly greater longitudinal flexiblity is being weighted, it may be necessary to make allowance for sagging of the article between the load-sensing devices.

Further it is to be understood that where in this specification reference is made to the resolved part or component acting in a given direction of a particular force, it is not intended by the use of the words "the resolved part acting in a given direction" or words having a similar meaning to exclude the possibility that the line of action of that particular force lies in the given direction.

The method and apparatus of the invention described in the above embodiment may be used to measure the weight of many different kinds of flexible article. For example it may be used to measure continuously the weight of many different rubber-covered woven fabric from a calendar, or the weight of rubber applied by the calendar to the fabric, if a preliminary measurement of the weight of the fabric along is made. Further, by summation, the method and apparatus may be used to measure the total load carried by, or the total weight of material added to, a longitudinally flexible article in a given time. An example of the use of the invention is in measuring the weight of material carried on a moving conveyor, in which the total weight of the conveyor and its freight i.e. the weight of the loaded article, is measured and the known weight of the conveyor along i.e. the weight of the unloaded article, subtracted therefrom. Such conveyors can be of many known forms, for example belts, chain, or wire rope. In the case of chains, sprockets can be provided and grooved pulleys for wire rope.

It will be understood however, that in calibrating apparatus according to the invention to indicate the weight-per-unit length of flexible article being weighed, or in calculating the weight-per-unit length from results obtained from the apparatus, it is necessary to assume that the article being weighed has a substantially uniform weight-per-unit length over the length of the article which is being weighed at any given time i.e. over the length of the article between the first and third support rollers in the embodiment described. While this assumption can usually be validly made for the uses for which the machine is intended it will be appreciated that it may not be correct to make this assumption in the case of a conveyor belt carrying freight including large discrete bodies such as uncrushed ore, when the presence of a large rock for example in the region of one of the weighing rollers may cause the apparatus to indicate an incorrect weight.

The predetermined lengths of a portion of belt, 16 and 17, are usually fixed in length. However it is possible to provide means for simultaneously varying these lengths, at the same time maintaining the predetermined relationship between the lengths. This can be done, for example, by moving the first and third support rollers 11 and 15. Such variation could be carried out intermittently to provide checking of the measuring devices, for example, checking of faulty readings, sticking meters, and similar faults.

In the past, as indicated previously, methods of measuring the weight of a longitudinally flexible moving article have necessitated the maintenance of constant tension in the article, and in practice this has been difficult to achieve. The present invention does not include this requirement because, as has been explained the effect of the forces arising from the tension of the article is continuously and automatically eliminated.

Having now described my invention, what I claim is:

1. A method of measuring the weight per unit of a loaded or unloaded longitudinally flexible elongated article comprising: supporting the article on a series of rotatable members spaced apart to define two different length portions of the article, positioning a weighing roller at the center position of each portion in contact with the article, supporting the weighing rollers by means including load cells positioned adjacent each end of a roller whereby the article exerts on each weighing roller a force which includes a tension-produced force, the component of the tension produced force acting in a designed direction for each weighing roller being substantially the same; measuring by the load cells the component acting in the designed direction of the total force exerted on each weighing member by its respective portion of the article and feeding the signals from the load cells for each roller to averaging circuits, one circuit for each roller.

2. A method as claimed in claim 1 wherein said article is belting as used for a conveyor.

3. A method as claimed in claim 1 wherein the article is a load-carrying conveyor, the conveyor having a known weight-per-unit length, including the steps of deducting the weight-per-unit length of the conveyor from the total weight of the conveyor and load, to give the weight of the load.

4. A method as claimed in claim 1 including the step of feeding the signals from the averaging circuits to a differencing circuit.

5 A method as claimed in claim 4 including feeding the signal from the differencing circuit to an indicator and/or a recorder.

6. Apparatus for measuring the weight-per-unit length of a loaded or unloaded longitudinally flexible elongated article comprising: a series of rollers means for mounting the article, each having their rotation axes substantially parallel to each other and spaced apart in alignment and including a first spaced pair of support rollers defining a first length portion of the article, a second spaced pair of support rollers defining a second length portion of the article, a first weighing roller in contact with the article positioned midway between the first pair of rollers, a second weighing roller in contact with the article located midway between the second pair of rollers and a load cell adjacent each end of each weighing roller, each load cell responsive to said component acting in a designed direction so that two different predetermined length portions are associated, one portion with said first weighing roller and the other portion with said second weighing roller, whereby the article exerts on each weighing roller a force which includes a tension-produced force, the arrangement being such that the component of the tension-produced force acting in the designed direction is substantially the same for both weighing rollers, each weighing roller being arranged to measure the component acting in the desired direction of the total force exerted on it by the respective portion of the elongated article.

7. Apparatus as claimed in claim 6, wherein the elongated article comprises a conveyor belt carrying a load, the conveyor belt having a predetermined weight-per-unit length, and means for subtracting a value corresponding to the weight-per-unit length of the belt from the component to the total force exerted by the belt.

8. Apparatus as claimed in claim 6, including a first and a second averaging circuit, means for feeding the signals from the load cells associated with one weighing roller to the first averaging circuit, and means for feeding the signals from the load cells associated with the other weighing roller to the second averaging circuit.

9. Apparatus as claimed in claim 8, including a differencing circuit and means for feeding the signals from the averaging circuits to the differencing circuit.

10. Apparatus as claimed in claim 9 including recording and/or indicating means, and means for feeding the signal from the differencing circuit to the recording and/or indicating means.

* * * * *